Patented Nov. 16, 1937

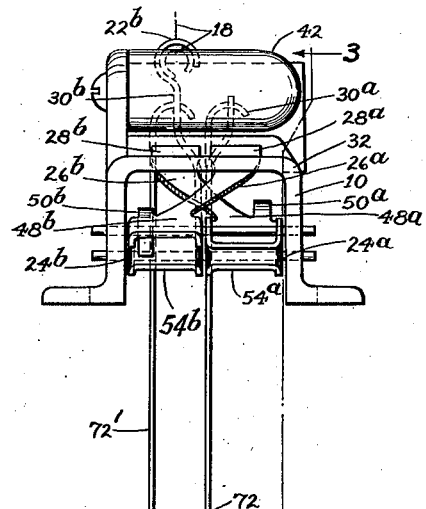
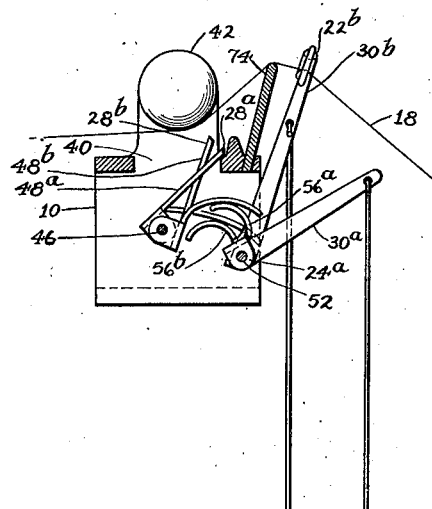
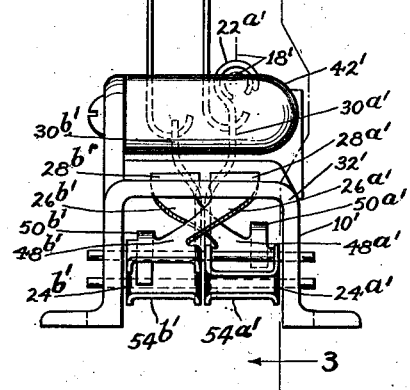
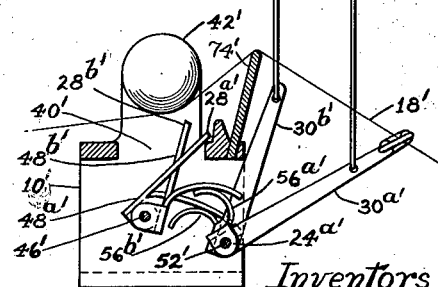
Fig. 2.
Fig. 3.
Inventors
Henry Owens
Samuel Bottomley
By Thomas A. Jenckes
Attorney Nov. 16, 1937.  H. OWENS ET AL  2,099,530
SELECTIVE STRAND TRAPPING AND CUTTING DEVICE FOR
USE IN STRAND DOUBLING OR TWISTING MACHINES
Filed March 1, 1937  6 Sheets-Sheet 3
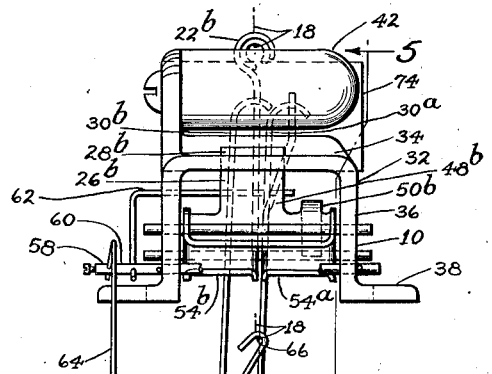
Fig. 4.
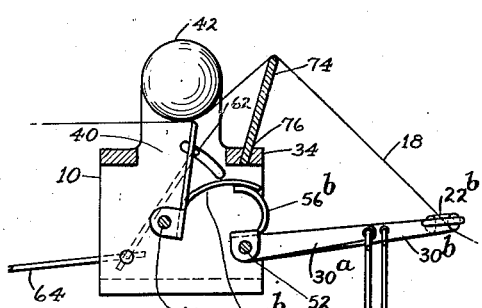
Fig. 5.
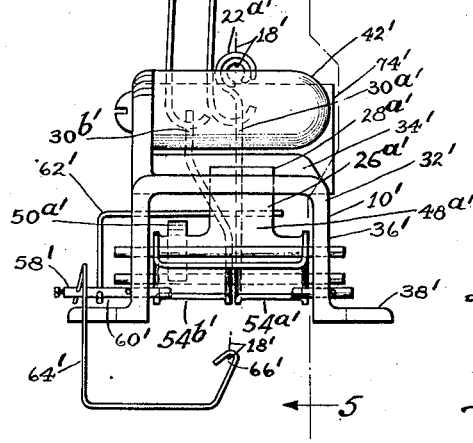
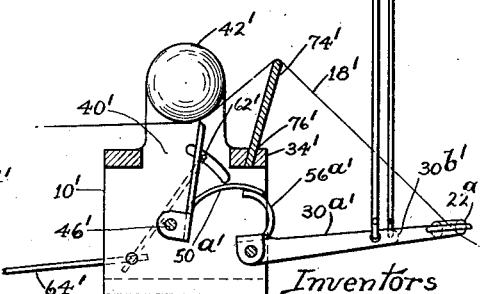
Inventors
Henry Owens
Samuel Bottomley
By Thomas A. Jenckes
Attorney

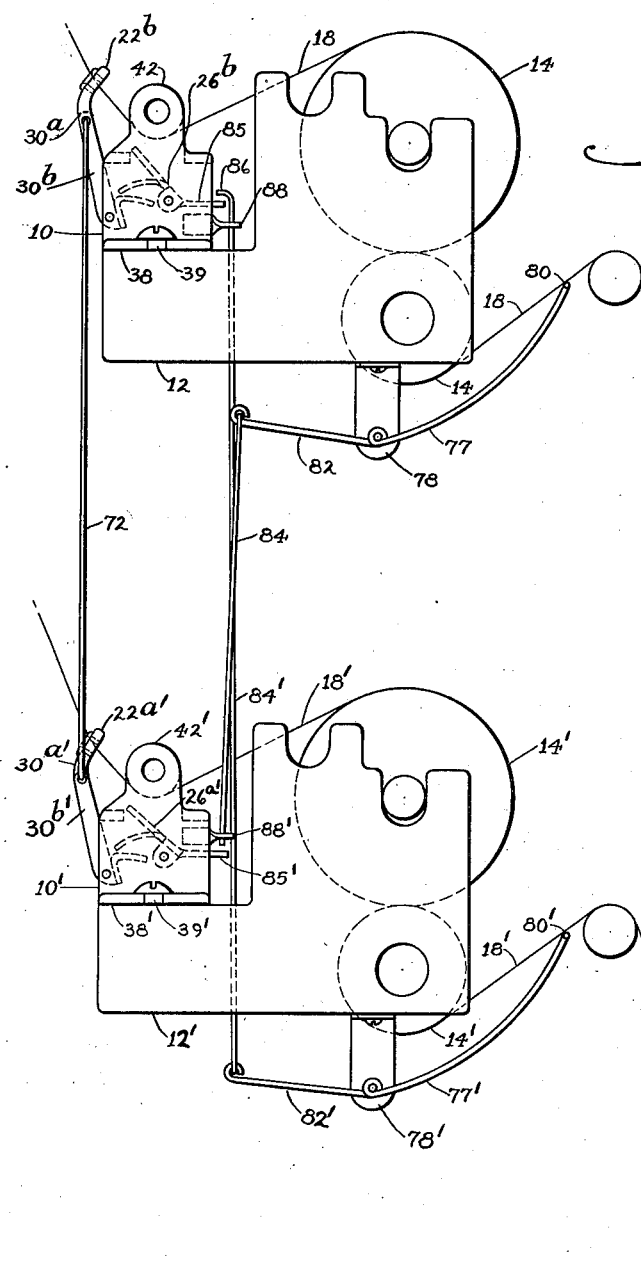

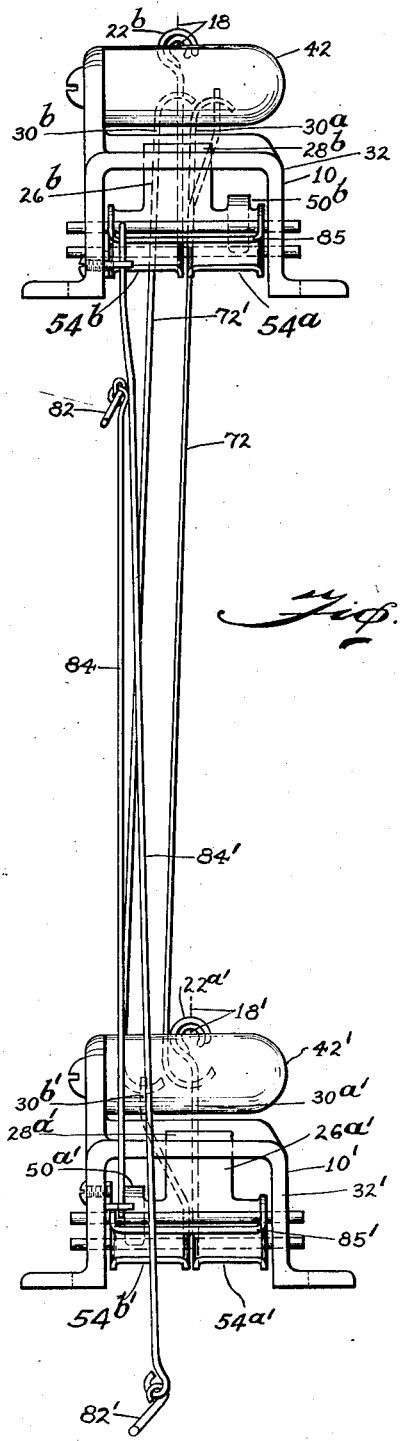

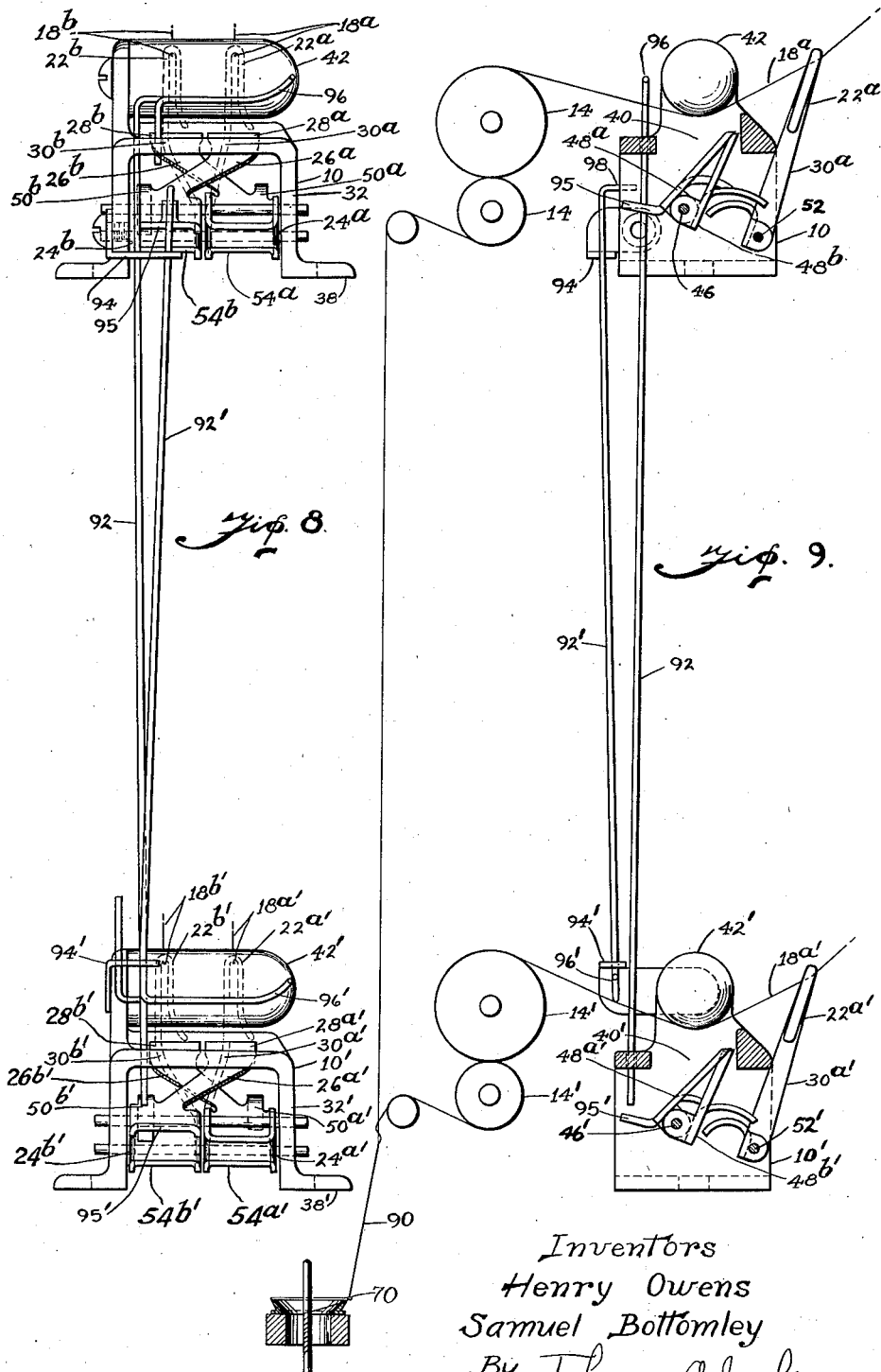

2,099,530

UNITED STATES PATENT OFFICE 2,099,530

SELECTIVE STRAND TRAPPING AND CUTTING DEVICE FOR USE IN STRAND DOUBLING OR TWISTING MACHINES

Henry Owens, Providence, R. I., and Samuel Bottomley, North Andover, Mass., assignors to Henry Owens & Company, Inc., Providence, R. I., a corporation of Rhode Island Application March 1, 1937, Serial No. 128,374

22 Claims. (Cl. 117—32)

Our invention relates to improvements in various adaptations of the invention of Henry Owens, a joint applicant herein, for Strand tensioning, slack compensating, selective trapping and cutting device, patented December 15, 1936, No. 2,064,685 to a strand doubling or twisting machine having twisting or spinning ring means and a plurality of vertically spaced pairs of strand nip feed rolls and adapted to have horizontally spaced strands passing through the respective pairs of vertically spaced feed rolls and including if desired in each row, embodiments of a supplemental means adapted to actuate the cutting or trapping means shown in said patent in rear of said feed rolls on breakage of the strand in front of said feed rolls.

Further objects of our invention are to provide various embodiments of devices adapted to function when single strands only are fed from each vertically spaced pair of strand feed rolls to the spinning or twisting means, or when a plurality of strands are fed from each of said vertically spaced pairs of feed rolls to be twisted into three- or four-ply or larger strands.

A further object of our invention is to provide an improved type of tension plate adapted to be inserted between the tension post and feed rolls of the device shown in said Patent No. 2,064,685 to insure contact of the strands with the tension post and to maintain them taut after leaving the post.

These and such other objects of our invention as may hereinafter appear will be best understood from a description of the embodiments thereof, such as are shown in the accompanying drawings adapted for use on a standard type of double roll fancy twister.

In the drawings, Fig. 1 is an end elevation of the end pairs of feed rolls of a double roll fancy twister having one embodiment of our invention attached thereto comprising a plurality of the cutting or trapping devices shown in Patent No. 2,064,685 with means vertically connecting the guide levers thereof, with the parts thereof so connected as to twist together single horizontally spaced strands from each row of feed rolls into a single twisted strand and each of the trapping devices having means adapted to actuate them on breakage of the strands in front of their respective feed rolls.

Fig. 2 is a rear elevation of an embodiment of our improved device in the actual position it assumes in use and employing a pair of cutting or trapping means for each vertically spaced row.

Fig. 3 is a longitudinal vertical sectional view taken through the embodiment of our device shown in Fig. 2.

Figure 1:
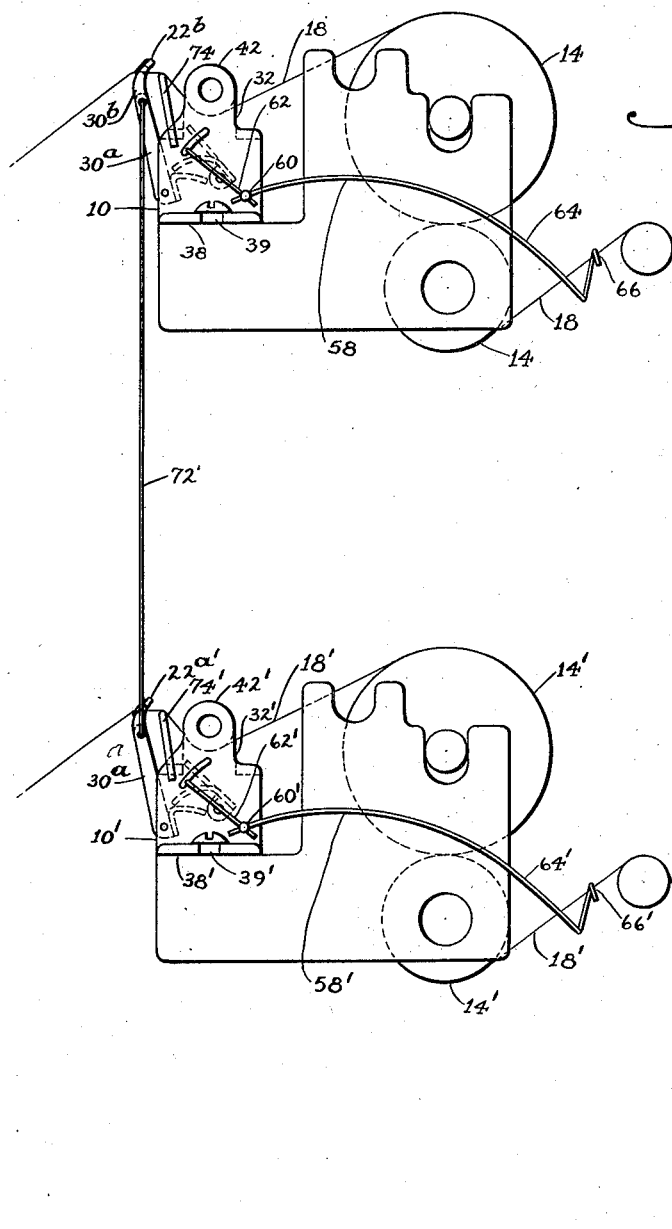

Figs. 4 and 5 are rear elevational and longitudinal vertical sectional views respectively generally similar to Figs. 2 and 3 of a different embodiment of our invention employing a single cutting or trapping means in each vertically spaced row and also illustrating the type of means illustrated in Fig. 1 adapted to actuate the respective cutting or trapping means on breakage of the strands in front of their respective feed rolls.

Figs. 6 and 7 are end and rear elevations respectively, generally similar to Figs. 1 and 4 of an alternative type of means adapted to break all the strands on breakage of a single strand in front of the feed rolls initially acting, however, on a cutting or trapping means in a vertically spaced row.

Figs. 8 and 9 are rear elevational and longitudinal vertical sectional views respectively, generally similar to Figs. 2 and 3 of an embodiment of our invention adapted to function on devices for twisting or spinning more than two strands together, namely, of more than one strand from each of the rows.

In the drawings, wherein like characters of reference indicate like parts throughout, 10 and 10' generally indicate a combination strand tensioning, slack compensating, selective trapping and cutting device of the type shown and claimed in Owens' Patent No. 2,064,685 heretofore referred to. As stated hitherto, our present invention covers the adaptation of such a device for use in a strand doubling or twisting machine having twisting ring means 70 and a plurality of vertically spaced pairs 14 and 14' of strand feed rolls and adapted to have the horizontally spaced strands 18 and 18' passing through the respective pairs of vertically spaced feed rolls 14 and 14'.

While we have shown in the drawings our invention applied to a standard type of a double roll fancy twister, it is obvious that it may be employed in any type of a strand doubling or twisting machine, feeding strands from a plurality of vertically spaced tiers, pairs or rows of feed rolls.

Broadly speaking, our invention includes employing a plurality of the devices shown in said patent, one device 10 for one set of feed rolls 14 and the other device 10' for the vertically spaced lower set of feed rolls 14' and means 72 and 72' operable on breakage of a strand in either row to move vertically to actuate the respective cutting or trapping means to break a strand in the opposite row and each portion of our invention, as in the embodiments of our invention shown in Figs. 2, 3, 8 and 9 comprises exact duplicates of said device 10 for each row of feed rolls with the vertically movable means 72 and 72' operatively connecting them together. Each of the units 10 specifically includes the individual strand guide means 22$^a$ and 22$^b$ for each strand, two in the embodiment shown adapted to keep said strands separate, each independently pivotally mounted as at 24$^a$ and 24$^b$ underneath its respective strand 18$^a$ and 18$^b$ and we provide cutting or trapping means 26$^b$ and 26$^a$ each projecting upwardly and terminating in the respective cutting or trapping edges 28$^b$ and 28$^a$. Each strand guide 22$^a$ and 22$^b$ is preferably so pivotally mounted as at 24$^a$ and 24$^b$ as to normally exert a light weight only on its respective strand and so that it may drop a substantial distance vertically away from its pivot 24$^a$ and 24$^b$ preferably of its own weight to compensate for slack in its respective strand to continuously maintain a uniform tension on said strand with increasing leverage until either on an accumulation of a predetermined amount of slack or on breakage of a strand, said strand guide may act with sufficient increased leverage to actuate said opposite cutting or trapping means 26$^b$ and 26$^a$ respectively. In my preferred embodiment the guide means 22$^a$ and 22$^b$ are mounted respectively on the power arms 30$^a$ and 30$^b$ adapted to actuate the adjacent work arm means 26$^b$ and 26$^a$ respectively to cut or trap its opposite strand respectively on the accumulation of a predetermined amount of slack in the respective strands or on respective breakage of the strands. The respective power arms 30$^a$ and 30$^b$ are adapted to actuate the independently mounted work arms 26$^b$ and 26$^a$ preferably through the medium of a lost motion connection later to be described. Our improved invention also includes the inverted U-shaped frame 32 having the inverted U-base 34, the U-legs 36 and the flanges 38 projecting laterally from the lower ends of said legs having the screw slots 39 therein for mounting thereof on the machine frame 12 preferably as in the embodiment shown near the feed rolls 14 of said machine. The inverted U-base 34 is provided with the central transverse slot 40 therein over opposite ends of which strands are adapted to pass. We also provide the tension post 42 mounted from one leg 36 of said U-shaped frame 32 to extend horizontally transversely over said slot 40 above said strands. While we preferably employ the tension post 42 to assist in exerting a more even tension of the strands to the draft or twisting means 14, and to provide a surface against which the trapping or cutting arms 26$^b$ and 26$^a$ may function, it is obvious that it may if desired, be dispensed with.

We provide a pivot pin 46 mounted transversely of said frame below said post 42 and we mount the relatively light work arms 26$^b$ and 26$^a$ as the work arms respectively of the pair of trapping levers 48$^a$ and 48$^b$ respectively each pivotally mounted adjacent one end of said pivot pin 46 and having the work arms 26$^b$ and 26$^a$ thereof extend obliquely transversely upwardly to cross each other and through the respective opposite ends of said frame transverse slot 40 and terminating in the trapping or cutting edges 28$^b$ and 28$^a$ adjacent the opposite strands below said post 42. It is thus obvious that with this construction the rear pivotal movement of said work arms 26$^b$ and 26$^a$ is limited by the rear edge of said transverse slot 40 for the purpose of assisting in providing the lost motion connection later to be described and the forward pivotal movement thereof is limited by the surface of the post 42. Said trapping or cutting levers 48$^a$ and 48$^b$ are also provided with the power arms 50$^a$ and 50$^b$ respectively projecting rearwardly therefrom and preferably having a substantially flat lower surface.

In our preferred embodiment we mount a second pivot pin 52 transversely of said frame in rear of said first pivot pin 46 and we provide a pair of guiding levers 54$^a$ and 54$^b$ each pivotally mounted as at 24$^a$ and 24$^b$ adjacent one end of said second pivot pin 52 each having the work arms 56$^a$ and 56$^b$ respectively projecting arcuately forwardly therefrom, in our preferred embodiment bent to generate a substantially involute cam upper surface to abut the lower surface of said trapping lever power arms 50$^a$ and 50$^b$ respectively to advance said power arms 50$^a$ and 50$^b$, where the involute cam surfaces be employed, at constant speed on dropping of said guide lever power arms 30$^a$ and 30$^b$. The guide lever power arms 30$^a$ and 30$^b$ in this embodiment are the respective power arms of the levers 54$^a$ and 54$^b$ and have mounted on the ends thereof the strand receiving and separating guides 22$^a$ and 22$^b$ respectively. The edges 28$^a$ and 28$^b$ are mere trapping edges as they function against the rear surface of the post 42 and drawing of the strands 18 and 18' therebetween causes a further wedging action of said edges 28$^a$ and 28$^b$ against said post to positively assist in trapping the threads. The respective work arms 26$^a$ and 26$^b$ cross in their upward movement. The width of the slot 40 is so regulated that when the respective power arms 26$^b$ and 26$^a$ abut the rear edge of said slot that the respective trapping lever power arms 50$^a$ and 50$^b$ will be out of contact with the respective work arms 56$^a$ and 56$^b$ of the trapping levers 54$^a$ and 54$^b$, the forward movement of the power arms 30$^a$ and 30$^b$ of said levers 54$^a$ and 54$^b$ being limited by abutting the rear edge of said U-shaped frame 32 to thus normally space the work arms 56$^a$ and 56$^b$ of said guide levers 54$^a$ and 54$^b$ vertically below and away from the power arms 50$^a$ and 50$^b$ of said trapping levers 48$^a$ and 48$^b$.

In the embodiment of our invention shown in Figs. 2 and 3 adapted to twist two horizontally spaced strands only, it is obvious that a respective guide 22$^a$ in the upper tier and a respective guide 22$^b$' in the lower tier can be removed and that opposite ends of the drop wires 72 and 72' are respectively connected to the power arms 30$^a$ and 30$^a$' and the power arms 30$^b$ and 30$^b$' so that when a thread in the guide 22$^b$ in the upper tier breaks the respective guide lever 30$^b$ will drop causing the rod 72 to drop and causing the guide lever 30$^b$' to actuate the opposite trapping edge 28$^a$' to trap or cut the opposite strand 18' and vice versa on breakage of the strand 18' in the lower tier to break the strand 18 in the upper tier.

We have discovered, however, that in working with single strands from each superimposed pair, row or tier, one of the lever power arms 26$^a$ and 26$^b$' with their respective cutting or trapping edges 28$^a$ and 28$^b$' may be dispensed with and the single cutting or trapping levers 48$^b$ and 48$^a$' with their respective trapping edges 28$^b$ and 28$^a$' and power arms 50$^b$ and 50$^a$' only need be employed as in the embodiments shown in Figs. 4–7. Also if desired cooperating work arms 56ᵇ and 56ᵃ' of the guide levers 54ᵇ and 54ᵃ' only need be retained. In this instance, the width of the respective retained trapping edges 28ᵇ and 28ᵃ' may be correspondingly lengthened, if desired, but still maintaining the horizontally spaced relationship of the threads 18 and 18' and their respective guides 22ᵇ and 22ᵃ'.

As stated, we also provide means normally supported by its respective strand in front of its feed rolls adapted to move on breakage of its respective strand to actuate the trapping or cutting means to break all strands in rear of said feed rolls. In the embodiment shown in Figs. 1, 4 and 5 we have employed an analogous device for this purpose to that shown in Owens' Patent No. 2,064,685 and for this purpose provide the supplemental lever 58 independently mounted on said frame 32 as at 60 having a rear work arm cross bar 62 underlying said trapping lever work arms 26ᵃ and 26ᵇ and a heavier power arm 64 projecting forwardly from said pivot 60 having strand guide means 66 thereon to be supported by the strand 18 beyond said feed rolls of said machine adapted on breakage of said strand or on an accumulation of an excessive amount of slack in said strand to tilt said lever 58 to raise the work arm 62 to abut both work arms 26ᵃ and/or 26ᵇ to raise them both against said tension post 42 or strands 18 or 18' to break said strands. An alternative type of means for this purpose will be described later.

In use, the respective strands 18 and 18' in the embodiments shown in Figs. 1-7 are threaded through the respective guides 22ᵇ and 22ᵃ' in horizontally spaced relationship and are raised to a normal operating, substantially vertical position in use. We have shown in Figs. 1-5 a tension plate 74 we preferably employ to insure contact of each strand 18 and 18' with each respective post 42 and 42' and to maintain the respective strands 18 and 18' taut after passing said posts, in the embodiment shown said tension plate 74 being suitably mounted in a suitable slot 76 formed in the top 34 of each U-shaped frame 32 to have the upper edge thereof underlie its respective strand 18 or 18'. In normal operation, it will then be obvious that unless too much slack accumulates or a breakage occurs in the strands 18 and 18' that the respective strands 18 and 18' will normally retain their strand guides 22ᵇ and 22ᵃ' and lever power arms 30ᵇ and 30ᵃ' against the rear edge of said frame 32 in a position only slightly vertically offset from their pivots 24ᵇ and 24ᵃ', so that said guides and levers 22ᵇ and 22ᵃ' will exert only a relatively slight weight on the respective strands and will uniformly tension said strands to said twisting or draft means. It is also apparent that with accumulation of slack between the feed rolls 14 and the source of supply of the respective strands 18 and 18' that the guides 22ᵇ and 22ᵃ' and power arms 30ᵇ and 30ᵃ' will drop by gravity of their own weight to compensate for variations in slack in their respective strands away from their respective pivots 24ᵇ and 24ᵃ' to maintain a uniform tension on the respective strands, namely, drop from the position shown in Fig. 1 to the position shown in Fig. 3 and as shown in Fig. 3 to permit said power arm 30ᵇ to drop this substantial distance without its work arm 56ᵃ' contacting said trapping lever power arm 50ᵃ' to provide a lost motion and that each respective guide lever power arm 30ᵇ as shown in Fig. 3 may drop a further substantial distance to compensate for slack in its respective strand away from its pivot 24ᵇ to still maintain a substantially uniform tension and with increasing leverage with said work arm 56ᵃ', as shown in Fig. 3, raising said trapping lever power arm 50ᵃ' at constant speed if an involute cam surface be employed until slow dropping of said power arm 30ᵇ' as shown in Fig. 5 on an excessive amount of slack in the strand 18 or on rapid dropping thereof on breakage of a strand 18 causes said trapping lever work arm 26ᵃ' to abut said lower post or respective vertically spaced strand with sufficient increased leverage to break said vertically spaced strand 18'. It is apparent that when the power arm 30ᵇ or strand guide 22ᵇ gets near its lowermost position, that it will operate through the weight of the power arms 30ᵇ and 30ᵇ' and connecting guide wire 72 to operate with sufficient leverage to throw the trapping edge 28ᵃ' against the post 42' to break the strand 18'.

The operation of the respective levers 58 and 58' in front of the feed rolls 14 and 14' adapted to operate their adjacent trapping devices 10 and 10' to break their respective strands 18 and 18' in front of said rolls 14 and 14' has been hitherto described. It is thus obvious that when the strand 18 is broken in rear of its feed rolls, in the embodiment of our invention, shown in Figs. 1, 4 and 5, that its respective power arms 30ᵇ and 30ᵇ' and connection 72 will drop with sufficient leverage to actuate the work arm 26ᵃ' to cause the trapping or cutting edge 28ᵃ' thereof to break the strand 18' and, in the device shown in Figs. 1, 4 and 5 additional means are provided normally supported by its respective strand in front of its feed rolls 14 or 14' connected to its adjacent trapping or cutting means and adapted to drop on breakage of its respective strand in front of its feed rolls to actuate said adjacent trapping or cutting means to break the adjacent strand in rear of its feed rolls, whereby the respective strand guide for said broken strand may drop to actuate the vertically spaced trapping or cutting means to break another vertically spaced strand in rear of its feed rolls.

We have shown in Figs. 6 and 7, however, an alternative type of means normally supported by its respective strand in front of its feed rolls adapted to move on breakage of its respective strand to actuate the trapping or cutting means to break the strands in rear of said feed rolls. In this instance, however, said means functions to first break the vertically and horizontally spaced opposite strand in rear of its respective feed rolls, which then in turn by the mechanism hitherto described will function to actuate the proper trapping or cutting means to break the first broken strand in rear of its feed rolls and for this purpose we pivotally mount a supplemental lever 77 or 77' below its respective feed rolls 14 or 14' on a pivot 78 or 78' depending from its respective frame 12 or 12'. Said lever 77 or 77' terminates in a horizontally disposed end 80 or 80' adapted to abut the lower surface of each respective strand 18 or 18' in front of its feed rolls and the end 82 or 82' terminating substantially in line with the end of the vertically spaced trapping lever work arm 26ᵇ or 30ᵃ' and we provide vertically reciprocatable means or guide wires 84 or 84' each having one end thereof pivotally attached to the work arm 82 or 82' of said lever and the opposite end thereof adapted to abut the upper surface of an extension 85 or 85' of the respective trapping lever work arm 30ᵇ or 30ᵃ′ on raising of said respective lever end 80 or 80′ on breakage of a thread 18 or 18′ in front of its feed rolls to actuate the vertically spaced trapping lever work arm lever 26ᵇ or 26ᵃ′ to break the vertically spaced strand 18 or 18′ in rear of its feed rolls 14 or 14′, whereby its respective strand guide 22ᵇ or 22ᵃ′ may drop to actuate the adjacent trapping and cutting edge 28ᵇ or 28ᵃ′ to break the first broken strand 18 or 18′ in rear of its feed rolls. The guide wire 84′ is provided with an inwardly bent upper end 86 so as to overlie the extension 85 of the trapping lever work arm 26ᵇ, whereas the lower end of the guide wire 84 may be left straight to abut the upper surface of the extension 85′ of the trapping lever work arm 26ᵃ′, suitable guides 88 and 88′ being provided in said frames 32 and 32′ for holding the vertically reciprocatable guide wires 84 and 84′.

The devices shown in Figs. 1–7 are primarily adapted for use in twisting single strands from a pair, row or tier of feed rolls. We have shown in Figs. 8 and 9 an embodiment of our invention in which two strands for each tier may be twisted into a three or four-ply strand and for this purpose we provide in reality, a single unit 10 or 10′ for each tier of the exact type shown in Patent No. 2,064,685 and we provide supplemental means to actuate a trapping lever work arm in the opposite vertically spaced tier or row to break a thread in said tier or row, whereby the other trapping lever work arm will then operate in the usual manner to break the other thread in said row.

We have shown in Figs. 8 and 9 therefore, two threads, namely, 18ᵃ and 18ᵇ respectively passing through the upper device 10 and two threads 18ᵃ′ and 18ᵇ′ passing through the lower device 10′ adapted to be twisted together into the single four-ply strand 90, or if desired one of said threads may be omitted to form a three-ply strand. It is obvious that the device 10 or 10′ will function to first break on breakage of one of its respective strand 18ᵃ or 18ᵇ, or 18ᵃ′ or 18ᵇ′, the respective adjacent strand and when this has taken place, it is obvious that both strands passing through each of the vertically spaced devices 10 and 10′ in each row will become broken. When this eventuality has taken place, we provide means to cause the breakage of all strands in the vertically spaced devices or rows preferably comprising drop wires 92 and 92′ passing through suitable holes in guides 94 and 94′ on the respective frames 32 and 32′ to be vertically reciprocatably mounted adjacent each of the respective posts 42 and 42′, each terminating in an end 96 or 96′ adapted to overlie a row of strands 18ᵃ and 18ᵇ or 18ᵃ′ and 18ᵇ′ and an opposite end adapted to abut a forwardly projecting extension 95 or 95′ of a respective work arm 28ᵃ or 28ᵃ′, preferably located for convenience on the same side of the devices to trip said respective work arm to break one vertically spaced strand, in the embodiment shown, the vertically spaced strands 18ᵇ or 18ᵇ′, whereby the respective guide levers 22ᵇ and 22ᵇ′ for its respective strand may drop to break its own adjacent strands 18ᵃ or 18ᵃ′ in each of said vertically aligned rows of threads.

It is thus obvious that each of the devices 10 and 10′ operates first on breakage of one strand to break the opposite of its pair of strands and when all the strands in each row of the respective devices 10 and 10′ have broken the respective drop wires 92 and 92′ are moved to actuate the respective extensions 95 and 95′ to break a strand in the opposite row, whereupon said respective devices 10 and 10′ will then operate as usual to break its respective adjacent pair of strands in said row. For this purpose the upper end of the drop wire 92 is bent inwardly as at 98 to overlie the extension 95 in the upper unit 10.

It is apparent therefore that we have provided various novel embodiments or adaptations of pairs of units described in Owens Patent No. 2,064,685 or modifications thereof for use in breaking all strands in strand doubling or twisting machines having twisting ring means and a plurality of vertically spaced pairs of strand nip feed rolls.

It is understood that our invention is not limited to the specific embodiments shown and that various deviations may be made therefrom without departing from the spirit and scope of the appended claims.

What we claim is:

1. A device for use in a strand doubling or twisting machine having twisting ring means and a plurality of vertically spaced pairs of strand nip feed rolls and adapted to have horizontally spaced strands passing through the respective vertically spaced pairs of feed rolls comprising horizontally spaced guides for guiding respective strands to said respective feed rolls adapted to be independently pivotally mounted in rear of their respective feed rolls, individual trapping or cutting means for each strand adapted to be independently pivotally mounted in rear of their respective feed rolls and connecting means extending from the respective strand guides to the respective vertically spaced trapping or cutting means.

2. A device for use in a strand doubling or twisting machine, having twisting ring means and a plurality of vertically spaced pairs of strand nip feed rolls and adapted to have strands passing through the respective vertically spaced feed rolls, comprising guides for guiding respective strands to said respective feed rolls adapted to be independently pivotally mounted in rear of their respective feed rolls, individual trapping or cutting means for each strand adapted to be independently pivotally mounted in rear of their respective feed rolls and connecting means extending from the respective strand guides to the respective trapping or cutting means.

3. A device for use in a strand doubling or twisting machine having twisting ring means and a plurality of vertically spaced pairs of strand nip feed rolls and adapted to have horizontally spaced strands passing through the respective vertically spaced feed rolls, comprising horizontally spaced guides for guiding respective strands to said respective feed rolls adapted to be independently pivotally mounted in rear of their respective feed rolls, individual trapping or cutting means for each strand adapted to be independently pivotally mounted in rear of their respective feed rolls, connecting means extending from the respective strand guides to the respective vertically spaced trapping or cutting means and means normally supported by each respective strand in front of its feed rolls adapted to move on breakage of its respective strand to actuate the trapping or cutting means to break all strands in rear of said feed rolls.

4. A device for use in a strand doubling or twisting machine having twisting ring means and a plurality of vertically spaced pairs of strand nip feed rolls and adapted to have strands passing through the respective vertically spaced feed rolls, comprising guides for guiding respective strands to said respective feed rolls adapted to be independently pivotally mounted in rear of their respective feed rolls, individual trapping or cutting means for each strand adapted to be independently pivotally mounted in rear of their respective feed rolls, connecting means extending from the respective strand guides to the respective trapping or cutting means and means normally supported by each respective strand in front of its feed rolls adapted to move on breakage of its respective strand to actuate the trapping or cutting means to break the strands in rear of said feed rolls.

5. A device for use in a strand doubling or twisting machine having twisting ring means and a plurality of vertically spaced pairs of strand nip feed rolls and adapted to have horizontally spaced strands passing through the respective vertically spaced feed rolls, comprising horizontally spaced guides for guiding respective strands to said respective feed rolls adapted to be independently pivotally mounted in rear of their respective feed rolls, individual trapping or cutting means for each strand adapted to be independently pivotally mounted in rear of their respective feed rolls, connecting means extending from the respective strand guides to the respective spaced trapping or cutting means, and means normally supported by each respective strand in front of its feed rolls connected to the adjacent trapping or cutting means and adapted to drop on breakage of its respective strand to actuate said adjacent trapping or cutting means to break an adjacent strand in rear of its feed rolls, whereby the respective strand guide for said broken strand may drop to actuate the vertically spaced trapping or cutting means to break another vertically spaced strand in rear of its feed rolls.

6. A device for use in a strand doubling or twisting machine having twisting ring means and a plurality of vertically spaced pairs of strand nip feed rolls and adapted to have strands passing through the respective vertically spaced feed rolls, comprising guides for guiding respective strands to said respective feed rolls adapted to be independently pivotally mounted in rear of their respective feed rolls, individual trapping or cutting means for each strand adapted to be independently pivotally mounted in rear of their respective feed rolls, connecting means extending from the strand guides to the respective trapping or cutting means, and means normally supported by each respective strand in front of its feed rolls connected to the adjacent trapping or cutting means and adapted to drop on breakage of its respective strand to actuate said adjacent trapping or cutting means to break an adjacent strand in rear of its feed rolls, whereby the respective strand guide for said broken strand may drop to actuate the vertically spaced trapping or cutting means to break another vertically spaced strand in rear of its feed rolls.

7. A device for use in a strand doubling or twisting machine having twisting ring means and a plurality of vertically spaced pairs of strand nip feed rolls and adapted to have horizontally spaced strands passing through the respective vertically spaced feed rolls, comprising guides for guiding respective strands to said respective feed rolls adapted to be independently pivotally mounted in rear of their respective feed rolls, individual trapping or cutting means for each strand adapted to be independently pivotally mounted in rear of their respective feed rolls, connecting means extending from the respective strand guides to the respective trapping or cutting means, and means normally supported by each respective strand in front of its feed rolls connected to the vertically spaced trapping or cutting means and adapted to rise on breakage of its respective strand to actuate a vertically spaced trapping or cutting means to break a vertically spaced strand in rear of its feed rolls, whereby its respective strand guide may drop to actuate the adjacent trapping or cutting means to break the first broken strand in rear of its feed rolls.

8. A device for use in a strand doubling or twisting machine having twisting ring means and a plurality of vertically spaced pairs of strand nip feed rolls and adapted to have strands passing through the respective vertically spaced feed rolls, comprising guides for guiding respective strands to said respective feed rolls adapted to be independently pivotally mounted in rear of their respective feed rolls, individual trapping or cutting means for each strand adapted to be independently pivotally mounted in rear of their respective feed rolls, connecting means extending from the respective strand guides to the respective trapping or cutting means, and means normally supported by each respective strand in front of its feed rolls connected to the vertically spaced trapping or cutting means and adapted to rise on breakage of its respective strand to actuate a vertically spaced trapping or cutting means to break a vertically spaced strand in rear of its feed rolls, whereby its respective strand guide may drop to actuate the adjacent trapping or cutting means to break the first broken strand in rear of its feed rolls.

9. A device for use in a strand doubling or twisting machine having twisting ring means and a plurality of vertically spaced rows of strand nip feed rolls and adapted to have strands passing through the respective vertically spaced feed rolls, comprising individual trapping or cutting means for each strand in a row adapted to be independently pivotally mounted in rear of their respective nip rolls and means operable on breakage of a strand in either row to move to actuate the respective cutting or trapping means to break a strand in the opposite row.

10. A device for use in a strand doubling or twisting machine having twisting ring means and a plurality of vertically spaced rows of strand nip feed rolls and adapted to have strands passing through the respective vertically spaced feed rolls, comprising individual trapping or cutting means for all strands in a row adapted to be independently pivotally mounted in rear of their respective nip rolls and means operable on breakage of a strand in either row to move to actuate the respective cutting or trapping means to break all the strands in the opposite row.

11. A device for use in a strand doubling or twisting machine having twisting ring means and a plurality of vertically spaced pairs of strand nip feed rolls and adapted to have horizontally spaced strands passing through the respective vertically spaced feed rolls, comprising a pair of lever means each adapted to be independently pivotally mounted underneath each respective strand having work arm means having a horizontally spaced cutting or trapping edge for the opposite strand and having heavier power arm means each including a portion pivotally mounted adjacent the respective strand having strand guide means for said strand mounted thereon and a movable portion connecting said pivotal strand guide holding portion and said work arm means to actuate on breakage of said strand said work arm means to break said horizontally and vertically spaced strand.

12. A selective trapping or cutting device for use in strand doubling or twisting machines having twisting ring means and a plurality of vertically spaced pairs of strand nip feed rolls and adapted to have horizontally spaced strands passing through the respective vertically spaced feed rolls, comprising a tension post adapted to be mounted transversely horizontally above each vertically spaced row of strands, a pivot pin adapted to be mounted transversely below each post, a trapping lever pivotally mounted on each pivot pin and having a work arm extending upwardly and terminating in a trapping or cutting edge below said post and a power arm projecting rearwardly therefrom, a second pivot pin adapted to be mounted transversely of said post in rear of said first pivot pin, a pair of guide levers each pivotally mounted adjacent one end of each second pivot pin, one of said guide levers for each second pin having a work arm projecting arcuately forwardly therefrom to abut the lower surface of said trapping lever power arm to advance it and the other of said guide levers for each second pin having a strand receiving and separating guide mounted thereon and vertically movable means connecting the horizontally aligned guide levers to actuate on breakage of one strand the respective work arm for the opposite strand to break said vertically and horizontally spaced strand and tension plates adapted to be mounted between the guides and feed rolls having upper edges adapted to abut the strands.

13. A selective trapping or cutting device for use in strand doubling or twisting machines having twisting ring means and a plurality of vertically spaced pairs of strand nip feed rolls and adapted to have horizontally spaced strands passing through the respective vertically spaced feed rolls, comprising a tension post adapted to be mounted transversely horizontally above each vertically spaced row of strands, a pivot pin adapted to be mounted transversely below each post, a trapping lever pivotally mounted on each pivot pin and having a work arm extending upwardly and terminating in a trapping or cutting edge below said post and a power arm projecting rearwardly therefrom, a second pivot pin adapted to be mounted transversely of said post in rear of said first pivot pin, a pair of guide levers each pivotally mounted adjacent one end of each second pivot pin, one of said guide levers for each second pin having a work arm projecting arcuately forwardly therefrom to abut the lower surface of said trapping lever power arm to advance it and the other of said guide levers for each second pin having a strand receiving and separating guide mounted thereon and vertically movable means connecting the horizontally aligned guide levers to actuate on breakage of one strand the respective work arm for the opposite strand to break said vertically and horizontally spaced strand.

14. A selective trapping or cutting device for use in strand doubling or twisting machines having twisting ring means and a plurality of vertically spaced pairs of strand nip feed rolls and adapted to have horizontally spaced strands passing through the respective vertically spaced feed rolls, comprising a tension post adapted to be mounted transversely horizontally above each vertically spaced row of strands, a pivot pin adapted to be mounted transversely below each post, a trapping lever pivotally mounted on each pivot pin and having a work arm extending upwardly and terminating in a trapping or cutting edge below said post and a power arm projecting rearwardly therefrom, a second pivot pin adapted to be mounted transversely of said post in rear of said first pivot pin, a pair of guide levers each pivotally mounted adjacent one end of each second pivot pin, one of said guide levers for each second pin having a work arm projecting arcuately forwardly therefrom to abut the lower surface of said trapping lever power arm to advance it and the other of said guide levers for each second pin having a strand receiving and separating guide mounted thereon, horizontally movable means connecting the vertically aligned guide levers to actuate on breakage of one strand the respective work arm for the opposite strand to break said vertically and horizontally spaced strand and means normally supported by each respective strand in front of its feed rolls adapted to move on breakage of its respective strand to actuate the trapping or cutting means to break all strands in rear of said feed rolls.

15. A selective trapping or cutting device for use in strand doubling or twisting machines having twisting ring means and a plurality of vertically spaced pairs of strand nip feed rolls and adapted to have horizontally spaced strands passing through the respective vertically spaced feed rolls, comprising a tension post adapted to be mounted transversely horizontally above each vertically spaced row of strands, a pivot pin adapted to be mounted transversely below each post, a trapping lever pivotally mounted on each pivot pin and having a work arm extending upwardly and terminating in a trapping or cutting edge below said post and a power arm projecting rearwardly therefrom, a second pivot pin adapted to be mounted transversely of said post in rear of said first pivot pin, a pair of guide levers each pivotally mounted adjacent one end of each second pivot pin, one of said guide levers for each second pin having a work arm projecting arcuately forwardly therefrom to abut the lower surface of said trapping lever power arm to advance it and the other of said guide levers for each second pin having a strand receiving and separating guide mounted thereon, vertically movable means connecting the horizontally aligned guide levers to actuate on breakage of one strand, the respective work arm for the opposite strand to break said vertically and horizontally spaced strand, and a supplemental lever adapted to be independently pivotally mounted to have a rear work arm cross bar underlying each trapping lever work arm and a heavier power arm projecting forwardly from its pivot having a strand guide thereon adapted to be supported by the single stand in front of its respective feed rolls adapted to drop on breakage of its respective strand to actuate said adjacent trapping or cutting means to break an adjacent strand in rear of its feed rolls, whereby the respective guide of said broken strand may drop to actuate the vertically spaced trapping or cutting means to break said vertically and horizontally spaced strand in rear of its feed rolls.

16. A selective trapping or cutting device for use in strand doubling or twisting machines having twisting ring means and a plurality of vertically spaced pairs of strand nip feed rolls and adapted to have horizontally spaced strands passing through the respective vertically spaced feed rolls, comprising a tension post adapted to be mounted transversely horizontally above each vertically spaced row of strands, a pivot pin adapted to be mounted transversely below each post, a trapping lever pivotally mounted on each pivot pin and having a work arm extending upwardly and terminating in a trapping or cutting edge below said post and a power arm projecting rearwardly therefrom, a second pivot pin adapted to be mounted transversely of said post in rear of said first pivot pin, a pair of guide levers each pivotally mounted adjacent one end of each second pivot pin, one of said guide levers for each second pin having a work arm projecting arcuately forwardly therefrom to abut the lower surface of said trapping lever power arm to advance it and the other of said guide levers for each second pin having a strand receiving and separating guide mounted thereon, vertically movable means connecting the horizontally aligned guide levers to actuate on breakage of one strand, the respective work arm for the opposite strand to break said vertically and horizontally spaced strand and a supplemental lever adapted to be pivotally mounted below each set of nip rolls having a power arm terminating in a horizontally disposed end adapted to abut the lower surface of each respective strand in front of its feed rolls and a work arm terminating substantially vertically in line with the end of the respective vertically spaced trapping lever power arm and vertically reciprocatable means having one end thereof pivotally attached to the work arm of said lever and the opposite end thereof adapted to abut the upper surface of said trapping lever to drop on rising of the respective lever power arm on breakage of its respective strand to actuate the vertically spaced trapping lever to break a vertically spaced strand in rear of its feed rolls, whereby its respective strand guide may drop to actuate the adjacent trapping or cutting edge to break the first broken strand in rear of its feed rolls.

17. A selective trapping or cutting device for use in strand doubling or twisting machines having twisting ring means and a plurality of vertically spaced pairs of strand nip feed rolls and adapted to have horizontally spaced pairs of strands passing through the respective vertically spaced feed rolls, comprising a tension post adapted to be mounted transversely horizontally above each vertically spaced row of strands, a pivot pin adapted to be mounted transversely below each post, a pair of trapping levers each pivotally mounted adjacent one end of said pivot pin and having a work arm extending obliquely transversely upwardly and terminating in a trapping or cutting edge below said post adjacent the opposite adjacent horizontally spaced strand and a power arm projecting rearwardly therefrom, a second pivot pin adapted to be mounted transversely of said post in rear of said first pivot pin, a pair of guide levers each pivotally mounted adjacent one end of said second pivot pin, each having a work arm projecting arcuately forwardly therefrom to abut the lower surface of said trapping lever power arm to advance it and a power arm, one of each horizontally aligned power arms only having a strand receiving and separating guide mounted on the end thereof and vertically movable means connecting the horizontally aligned guide levers to actuate on breakage of one strand the respective work arm for the vertically and horizontally spaced strand to break said vertically and horizontally spaced strand.

18. A selective trapping or cutting device for use in strand doubling or twisting machines having twisting ring means and a plurality of vertically spaced pairs of strand nip feed rolls and adapted to have horizontally spaced rows of strands passing through the respective vertically spaced feed rolls comprising a tension post adapted to be mounted transversely horizontally above each vertically superimposed row of strands, a pivot pin adapted to be mounted transversely below each post, a pair of trapping levers each pivotally mounted adjacent one end of said pivot pin and having a work arm extending obliquely transversely upwardly and terminating in a trapping or cutting edge below said post adjacent the opposite adjacent horizontally spaced strand and a power arm projecting rearwardly therefrom, a second pivot pin adapted to be mounted transversely of said post in rear of said first pivot pin, a pair of guide levers each pivotally mounted adjacent one end of said second pivot pin each having a work arm projecting arcuately forwardly therefrom to abut the lower surface of said trapping lever power arm to advance it and a power arm having a strand receiving and separating guide mounted on the end thereof and vertically movable drop wires connecting said horizontally aligned guide levers to actuate on breakage of one strand the respective work arm for a vertically and horizontally spaced strand to break said vertically and horizontally spaced strand.

19. A selective trapping or cutting device for use in strand doubling or twisting machines having twisting ring means and a plurality of vertically spaced pairs of strand nip feed rolls and adapted to have horizontally spaced rows of strands passing through the respective vertically spaced feed rolls comprising a tension post adapted to be mounted transversely horizontally above each vertically spaced row of strands, a pivot pin adapted to be mounted transversely below each post, a pair of trapping levers each pivotally mounted adjacent one end of said pivot pin and having a work arm extending obliquely transversely upwardly and terminating in a trapping or cutting edge below said post adjacent the opposite adjacent horizontally spaced strand and a power arm projecting rearwardly therefrom, a second pivot pin adapted to be mounted transversely of said post in rear of said first pivot pin, a pair of guide levers, each pivotally mounted adjacent one end of said second pivot pin each having a work arm projecting arcuately forwardly therefrom to abut the lower surface of said trapping lever power arm to advance it and a power arm having a strand receiving and separating guide mounted on the end thereof and vertically movable means connecting the horizontally aligned guide levers to actuate on breakage of one strand the respective work arm for the horizontally spaced and adjacent strand to break said horizontally spaced and adjacent strand and drop wires vertically reciprocatably mounted adjacent each respective post, each terminating in one end adapted to vertically overlie a row of strands and an opposite end adapted to actuate the work arm of a vertically spaced trapping lever to break a vertically spaced strand, whereby the respective guide lever may drop to break the opposite vertically spaced strand in each of said vertically spaced rows of strands.

20. A device for use in a strand doubling or twisting machine having twisting ring means and a plurality of vertically spaced pairs of strand nip feed rolls and adapted to have rows of horizontally spaced strands passing through the respective vertically spaced feed rolls, comprising a pair of lever means each adapted to be independently pivotally mounted underneath each respective horizontally spaced strand in each row having work arm means having a respectively horizontally spaced cutting or trapping edge for the opposite strand in said row and having a heavier power arm means having strand guide means mounted on the end thereof to actuate its respective work arm means to cut or trap the opposite strand in said row on breakage of its strand and means operable on breakage of the strands in either row to move to actuate a cutting or trapping work arm to break a strand in the opposite row, whereby its respective work arm means may rise to break the adjacent strand.

21. A device for use in a strand doubling or twisting machine having twisting ring means and a plurality of vertically spaced pairs of strand nip feed rolls and adapted to have rows of horizontally spaced strands passing through the respective vertically spaced feed rolls, comprising a pair of lever means each adapted to be independently pivotally mounted underneath each respective horizontally spaced strand in each row having work arm means having a respectively horizontally spaced cutting or trapping edge for the opposite strand in said row and a horizontally projecting extension and having heavier power arm means having strand guide means mounted on the end thereof to actuate its respective work arm means to cut or trap the opposite strand in said row on breakage of its strand and drop wires vertically reciprocatably mounted adjacent each respective post each terminating in one end adapted to vertically overlie a row of strands and an opposite end adapted to abut a vertically spaced trapping lever work arm means extension on breakage of all strands in said row to actuate said work arm means to break a vertically spaced strand, whereby its respective work arm means may rise to break the adjacent strand in said aligned row of strands.

22. A selective trapping or cutting device for use in twisting, winding, spinning, doubling or like machines having twisting or draft means acting on two strands, capable of exerting a uniform tension on the strands with variations in the slack thereof, comprising a tension post mounted transversely above said strands, a pivot pin mounted transversely below said post, a pair of trapping levers each pivotally mounted adjacent one end of said pivot pin and having a work arm extending obliquely transversely upwardly and terminating in a trapping or cutting edge below said post adjacent the opposite strand and a power arm projecting rearwardly therefrom, a second pivot pin mounted transversely of said frame in rear of said first pivot pin, a pair of guide levers each pivotally mounted adjacent one end of said second pivot pin, each having a work arm projecting arcuately forwardly therefrom to abut the lower surface of said trapping lever power arm to advance it and a heavier power arm having a strand receiving and separating guide mounted on the end thereof and a tension plate adapted to be mounted on said frame having an upper edge adapted to abut the strands.

SAMUEL BOTTOMLEY.
HENRY OWENS.